(12) United States Patent
Truemper et al.

(10) Patent No.: US 9,988,152 B2
(45) Date of Patent: Jun. 5, 2018

(54) AIRCRAFT AIR-CONDITIONING SYSTEM

(71) Applicant: Airbus Operations GmbH, Hamburg (DE)

(72) Inventors: Torsten Truemper, Hamburg (DE); Matthias Reiss, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 926 days.

(21) Appl. No.: 14/243,061

(22) Filed: Apr. 2, 2014

(65) Prior Publication Data

US 2014/0299290 A1 Oct. 9, 2014

(30) Foreign Application Priority Data

| Apr. 3, 2013 | (DE) | 10 2013 005 595 |
| Apr. 3, 2013 | (DE) | 10 2013 005 596 |
| Jun. 14, 2013 | (DE) | 10 2013 211 177 |

(51) Int. Cl.
| *B60H 3/00* | (2006.01) |
| *B61D 27/00* | (2006.01) |
| *B64D 13/08* | (2006.01) |
| *F25B 21/04* | (2006.01) |
| *B64D 13/06* | (2006.01) |

(52) U.S. Cl.
CPC .......... *B64D 13/08* (2013.01); *B64D 13/06* (2013.01); *F25B 21/04* (2013.01); *B64D 2013/0629* (2013.01); *Y02B 30/52* (2013.01); *Y02T 50/56* (2013.01)

(58) Field of Classification Search
CPC ......... F25B 21/04; Y02T 50/54; Y02B 30/52; B64D 13/08; B64D 13/06; B64D 2013/0629; F24F 3/153

USPC ................................................ 62/173, DIG. 5
See application file for complete search history.

(56) References Cited

U.S. PATENT DOCUMENTS

| 5,513,500 A | 5/1996 | Fischer et al. |
| 7,802,732 B2 | 9/2010 | Scherer et al. |
| 2004/0195447 A1* | 10/2004 | Claeys .................. B64D 13/06 |
| | | 244/118.5 |
| 2008/0087039 A1 | 4/2008 | Reed et al. |

(Continued)

FOREIGN PATENT DOCUMENTS

| DE | 4340317 | 6/1995 |
| DE | 10361709 | 8/2005 |

(Continued)

OTHER PUBLICATIONS

German Search Report, dated Apr. 3, 2013 (102013005595.4).
German Search Report, dated Apr. 3, 2013 (102013005596.2).

*Primary Examiner* — Len Tran
*Assistant Examiner* — Jon T Schermerhorn
(74) *Attorney, Agent, or Firm* — Greer, Burns & Crain, Ltd.

(57) ABSTRACT

An aircraft air-conditioning system including an air-conditioning unit which is designed to provide cooled process air. A process air line conducts cooled process air provided by the air-conditioning unit into a working area of an aircraft cabin. A cooler supplies cooling energy to a device to be cooled which is provided in the working area of the aircraft cabin. Finally, the aircraft air-conditioning system includes a heat transfer arrangement which transfers waste heat generated by the cooler to process air flowing through the process air line.

17 Claims, 1 Drawing Sheet

(56) References Cited

U.S. PATENT DOCUMENTS

2009/0000329 A1  1/2009  Colberg et al.
2012/0322354 A1  12/2012  Andres

FOREIGN PATENT DOCUMENTS

| DE | 102006005035 | 9/2007 |
|----|--------------|--------|
| DE | 102012006628 | 10/2013 |
| EP | 1701884 | 9/2006 |
| EP | 1801009 | 6/2007 |
| EP | 1979233 | 10/2008 |
| WO | 2005030579 | 4/2005 |
| WO | 2012095646 | 7/2012 |

* cited by examiner

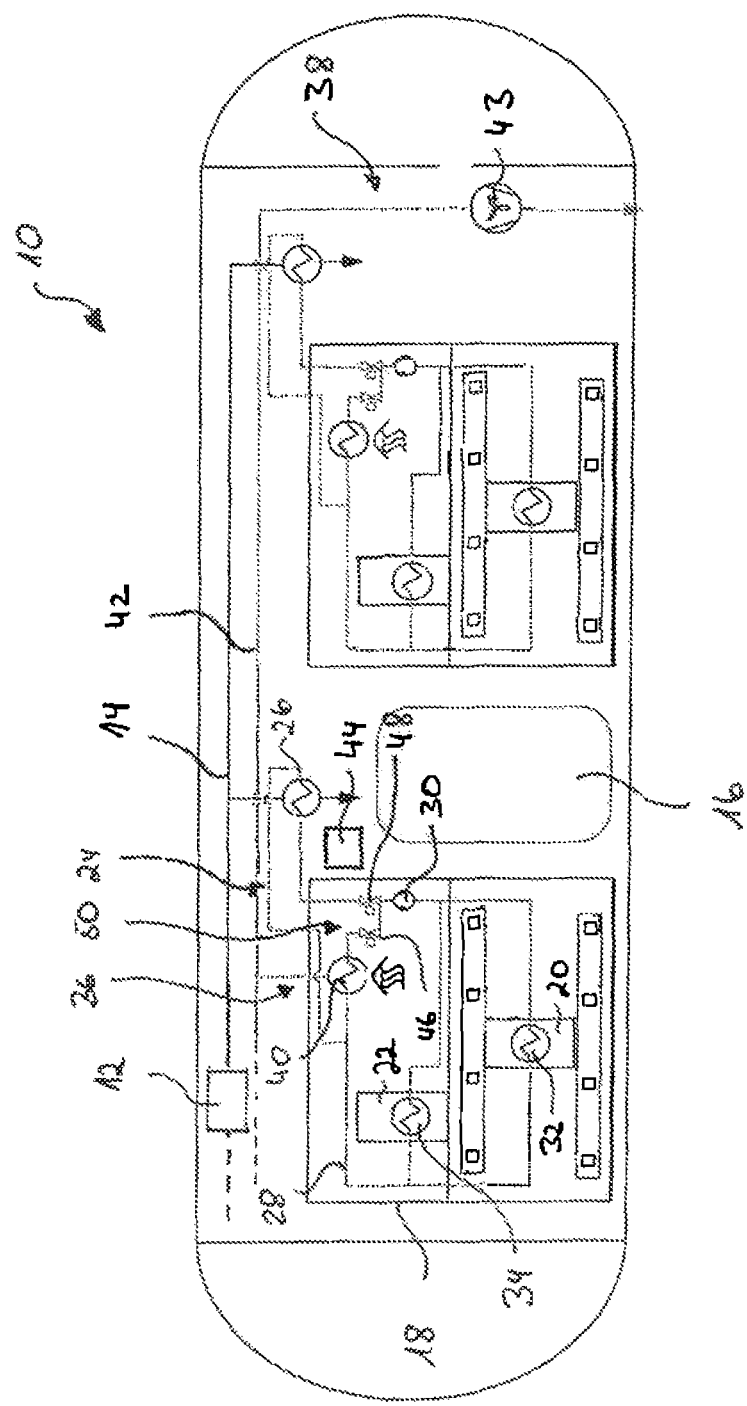

AIRCRAFT AIR-CONDITIONING SYSTEM

CROSS-REFERENCES TO RELATED APPLICATIONS

This application claims the benefit of the German patent application No. 102013005596.2 filed on Apr. 3, 2013, the German patent application No. 102013005595.4 filed on Apr. 3, 2013, and the German patent application No. 102013211177.0 filed on Jun. 14, 2013, the entire disclosures of which are incorporated herein by way of reference.

BACKGROUND OF THE INVENTION

The invention relates to an aircraft air-conditioning system and a process for working an aircraft air-conditioning system.

The cabin of a modern commercial aircraft is normally divided into different air-conditioning zones which are supplied with air-conditioning air as required by an air-conditioning unit of the aircraft. Typical air-conditioning zones of an aircraft cabin are, for example, a first class area, a business class area and an economy class area. The operation of an air-conditioning unit of the aircraft air-conditioning arrangement is normally controlled according to the cooling requirement of the air-conditioning zone with the highest cooling requirement, i.e., the air-conditioning unit provides cooled process air at a temperature which is sufficiently low to cool the air-conditioning zone with the highest thermal load generally the economy class area of the cabin—to a comfortable temperature. For example, the operation of the air-conditioning unit is controlled in such a way that it provides cooled process air at a temperature of 11° C.

To also enable a comfortable temperature to be set in air-conditioning zones with a lower thermal load, an appropriate quantity of hot engine bleed air is mixed with the cooled process air provided by the air-conditioning unit before the air is finally blown into the air-conditioning zone. As an alternative to this, the cooled process air provided by the air-conditioning unit can be heated to the desired temperature by means of an electric heating device before being supplied into an air-conditioning zone. These circumstances are described for example in EP 1 701 884 B1 or U.S. Pat. No. 7,802,732, B2.

Working areas which are provided in the door areas of the aircraft cabin and in which the on-board kitchens, the so-called galleys, of the aircraft are also arranged, are cabin areas with a particularly low thermal load since there are normally only a few people in these areas. Moreover, cooled galley areas, which serve for example for storing foodstuffs provided for distribution to the passengers of the aircraft, give off cooling energy to the environment. Finally, cooling energy is also supplied to the working areas of an aircraft cabin by way of cold interior surfaces of the aircraft doors. The air-conditioning air supplied to the working areas of the aircraft cabin by the aircraft air-conditioning arrangement therefore also normally has to be heated by means of appropriate heating devices, such as those described in EP 1 701 884 B1 or U.S. Pat. No. 7,802,732, to a considerably higher temperature than the temperature of the cooled process air provided by the air-conditioning unit of the aircraft air-conditioning arrangement in order to enable a comfortable ambient temperature to be set in the working areas of the aircraft cabin.

SUMMARY OF THE INVENTION

The object on which the invention is based is to provide an aircraft air-conditioning system and a process for working an aircraft air-conditioning system which enables energy-efficient air conditioning of working areas provided in an aircraft cabin.

An aircraft air-conditioning system according to the invention comprises an air-conditioning unit which is designed to provide cooled process air. The air-conditioning unit associated with an aircraft air-conditioning arrangement is normally supplied with compressed engine bleed air from an engine or an auxiliary engine of the aircraft. As an alternative to this, the air-conditioning unit may also be supplied with air which is compressed by a separate compressor. Before being supplied to the air-conditioning unit, the compressed engine bleed air or the air compressed by the compressor normally flows through a heat exchanger, a so-called pre-cooler, which cools the compressed engine bleed air or the air compressed by the compressor to a desired temperature. In the air-conditioning unit, the air is further cooled and expanded as it flows through at least one heat exchanger and various compression and expansion units.

The operation of the air-conditioning unit is normally controlled by a central control device of the aircraft air-conditioning arrangement. For example, the central control device of the aircraft air-conditioning arrangement may control the operation of the air-conditioning unit according to the cooling requirement of a cabin, which is divided into different air-conditioning zones, of an aircraft equipped with the aircraft air-conditioning arrangement. In particular, the central control device of the aircraft air-conditioning arrangement may control the operation of the air-conditioning unit according to the cooling requirement of the air-conditioning zone with the highest cooling requirement. In such a case, the operation of the air-conditioning unit is controlled by means of the central control device of the aircraft air-conditioning arrangement in such a way that the air-conditioning unit provides cooled process air at a temperature which is sufficiently low to cool the air-conditioning zone with the highest thermal load to a comfortable temperature. For example, the cooled process air provided by the air-conditioning unit may have a temperature of approximately 11° C.

The aircraft air-conditioning system further comprises a process air line which is designed to conduct cooled process air provided by the air-conditioning unit into a working area of an aircraft cabin. The working area may be arranged for example in a door area of the aircraft cabin, i.e., an area of the aircraft cabin which is adjacent to a door. A galley may be provided for example in the working area. The working area of an aircraft cabin differs from other areas of the aircraft cabin in particular in that there are normally relatively few people in the working area. Moreover, cooling energy can additionally make its way into the working area by way of galley areas which are cooled by way of cold surfaces or the aircraft doors. The working area therefore normally has a lower cooling requirement than other areas of the aircraft cabin, for example, a business class area or an economy class area, in which there are many passengers. Instead, the cooled process air provided by the air-conditioning unit normally has to be heated to a higher temperature before being supplied into the working area of the aircraft cabin in order to enable comfortable ambient conditions to be produced in the working area.

A cooler, which is designed to supply cooling energy to a device to be cooled, which is provided in the working area of the aircraft cabin, is moreover associated with the aircraft air-conditioning system. The cooler may be for example an air chiller, which supplies cooling energy for example to a galley device to be cooled. The galley device to be cooled may be for example a compartment of the galley which serves for storing foodstuffs provided for distribution to the aircraft passengers. In particular, if the cooler is constructed in the form of an air chiller, the cooler may be designed to operate with a two-phase coolant, i.e., a coolant which is converted from the liquid state into the gaseous state when giving off cooling energy to the device to be cooled.

The cooler generates waste heat during operation. If the cooler is operated with a two-phase coolant, the two-phase coolant, which is in the gaseous state of aggregation after giving off cooling energy to the device to be cooled, reverts back to the liquid state of aggregation as a result of thermal energy transfer to a corresponding fluid. The fluid serving to absorb the waste heat of the cooler may in turn be in the liquid or gaseous state of aggregation.

Finally, the aircraft air-conditioning system comprises a heat transfer arrangement. The heat transfer arrangement is designed to transfer the waste heat generated by the cooler to the process air flowing through the process air line. The heat transfer arrangement therefore ensures that the waste heat generated by the cooler can be used to heat the process air flowing through the process air line before it is supplied into the working area of the aircraft cabin. It is therefore no longer necessary to discharge the waste heat generated by the cooler to the aircraft environment with the aid of the aircraft air-conditioning arrangement or an additional cooling system. Moreover, to generate comfortable ambient conditions in the working area of the aircraft cabin, it is possible to forego energy-intensive heating of the process air by means of an additional heating device before it is supplied into the working area of the aircraft cabin.

Finally, owing to its low temperature of, for example, approximately 11° C., the process air flowing through the process air line constitutes a heat sink having a comparatively low temperature level for the waste heat to be discharged from the cooler. This means that the cooler may be operated particularly energy efficiently. In particular, with a cooler which is constructed in the form of an air chiller, it is possible to operate a compressor of the air chiller at a comparatively low speed. This enables a reduction in the noise emissions generated by the air chiller, thereby increasing the comfort of people in the aircraft cabin and in particular in the working area of the aircraft cabin.

The heat transfer arrangement of the aircraft air-conditioning system according to the invention may furthermore be designed to transfer waste heat generated by a heat-generating device of a galley to the process air flowing through the process air line. The heat-generating galley device may be for example an oven, a device for preparing hot drinks or any other galley device which generates waste heat during operation. The only significant factor is that the waste heat of this device does not have to be discharged to the aircraft environment in energy-intensive manner with the aid of the aircraft air-control arrangement or an additional cooling system, but can instead be used to heat the process air flowing through the process air line.

The heat transfer arrangement preferably comprises a heat exchanger which is designed to bring fluid which is heated by the waste heat of the cooler and/or the waste heat of the heat-generating device of the galley into thermal contact with the process air flowing through the process air line. The fluid heated by the waste heat of the cool and/or the waste heat of the heat-generating device of the galley is preferably a liquid heat carrier medium which is brought into thermal contact with the process air flowing through the process air line in the heat exchanger of the heat transfer arrangement.

As an alternative to this, however, it is possible to use a two-phase heat carrier medium, i.e., a heat carrier medium which is converted from the liquid state of aggregation into the gaseous state of aggregation as a result of absorbing thermal energy from the cooler and/or the heat-generating device and then converted back into the liquid state of aggregation again when flowing through the heat exchanger of the heat transfer arrangement.

The heat exchanger of the heat transfer arrangement may be connectable for example to a heat carrier circuit in which the fluid heated by the waste heat of the cooler and/or the waste heat of the heat-generating device of the galley circulates. A conveyor device, which is constructed for example in the form of a pump and conveys the fluid heated by the waste heat of the cooler and/or the waste heat of the heat-generating device of the galley through the heat carrier circuit, may be arranged in the heat carrier circuit. As an alternative to this, it is also possible to provide natural circulation for conveying the fluid heated by the waste heat of the cooler and/or the waste heat of the heat-generating device of the galley through the heat carrier circuit. The cooler and the heat-generating galley device may be arranged parallel to one another in the heat carrier circuit.

In a preferred embodiment, the aircraft air-conditioning system furthermore comprises a further heat transfer arrangement which is designed to transfer waste heat generated by the cooler and/or waste heat generated by the heat-generating device of the galley to a cabin air extraction system. The cabin air extraction system normally serves to divert waste heat from heat-generating devices on board the aircraft and/or bad smells from the aircraft cabin into the aircraft environment. The further heat transfer arrangement enables the waste heat of the cooler and/or the heat-generating galley device to be discharged to the aircraft environment, for example if it is undesirable for the process air flowing through the process air line to be heated before being supplied into the working area of the aircraft cabin. This may be the case for example if, on hot days, the aircraft cabin has to be cooled to a comfortable temperature level as quickly as possible during ground operations of the aircraft.

The further heat transfer arrangement may comprise a further heat exchanger which is designed to bring fluid heated by the waste heat of the cooler and/or the waste heat of the heat-generating device of the galley into thermal contact with cabin exhaust air which flows though a cabin exhaust air line of the cabin air extraction system. In a configuration of this type, the cabin exhaust air flowing through the cabin exhaust air line of the cabin air extraction system therefore absorbs the excess thermal energy of the cooler and/or the heat-generating galley device before the cabin exhaust air is discharged to the aircraft environment by way of the cabin exhaust air line. A conveyor device constructed in the form of a fan may be arranged in the cabin exhaust air line to convey the cabin exhaust air through the cabin exhaust air line.

The further heat exchanger of the further heat transfer arrangement preferably is connectable to the heat carrier circuit in which the fluid heated by the waste heat of the cooler and/or the waste heat of the heat-generating device of the galley circulates. Like the heat exchanger of the heat transfer arrangement, the further heat exchanger of the further heat transfer arrangement may therefore also have the fluid heated by the waste heat of the cooler and the heat-generating galley device flowing through it. As it flows through the further heat exchanger, the fluid gives off its excess thermal energy to the cabin exhaust air which is brought into thermal contact with the fluid in the further heat exchanger of the further heat transfer arrangement.

The aircraft air-conditioning system may furthermore comprise a control unit which is designed to control the operation of the heat transfer arrangement and the further heat transfer arrangement according to a set temperature of the process air to be supplied to the working area of the aircraft cabin in such a way that the waste heat generated by the cooler and/or the heat-generating device of the galley is alternatively transferred to the process air flowing through the process air line or to the cabin air extraction system in order to heat the process air flowing through the process air line to the desired set temperature. The control unit may be constructed for example in the form of an electronic control unit and integrated in the central control device of the aircraft air-conditioning arrangement. As an alternative to this, it is however also conceivable to construct the control unit as a separate control unit. Under the control of the control unit, it is always possible to heat the process air flowing through the process air line to a desired set temperature which enables comfortable ambient conditions to be set in the working area of the aircraft cabin.

The control unit is essentially able to control the operation of the heat transfer arrangement and the further heat transfer arrangement in such a way that the waste heat generated by the cooler and/or the heat-generating galley device is either transferred exclusively to the process air flowing through the process air line or exclusively to the cabin air extraction system. However, the control unit is preferably also designed to control the operation of the heat transfer arrangement and the further heat transfer arrangement so that the waste heat of the cooler and/or the heat-generating galley device is transferred in part to the process air flowing through the process air line and in part to the cabin air extraction system, with the quantity of heat which is transferred to the process air flowing through the process air line in particular being controlled so that the process air is heated to the desired set temperature.

In particular, the control unit may be designed to control a valve arrangement in such a way that the fluid which circulates in the heat transfer circuit and is heated by the waste heat of the cooler and/or the waste heat of the heat-generating device of the galley is alternatively brought into thermal contact with the process air flowing through the process air line or the cabin exhaust air flowing through the cabin exhaust air line of the cabin air extraction system according to a set temperature of the process air to be supplied to the working area of the aircraft cabin. For example, the control unit may control the valve arrangement in such a way that the heated fluid circulating in the heat carrier circuit is conducted either exclusively through the heat exchanger of the heat transfer arrangement or the further heat exchanger of the further heat transfer arrangement. Under the control of the control unit, however, the valve arrangement may also be controlled in such a way that the fluid flowing through the heat carrier circuit is conducted in part through the heat exchanger of the heat transfer arrangement and in part through the further heat exchanger of the further heat transfer arrangement. The partial volume flows of the heated fluid in the direction of the heat exchanger of the heat transfer arrangement and the further heat exchanger of the further heat transfer arrangement are preferably controlled during this according to the set temperature of the process air to be supplied to the working area of the aircraft cabin.

In a process according to the invention for working an aircraft air-conditioning system, cooled process air is provided by means of an air-conditioning unit of an aircraft air-conditioning arrangement. The cooled process air provided by the air-conditioning unit is conducted into a working area of an aircraft cabin by means of a process air line. Furthermore, cooling energy is supplied by means of a cooler to a device to be cooled which is provided in the working area of the aircraft cabin. Waste heat generated by the cooler is transferred to the process air flowing through the process air line by means of a heat transfer arrangement.

The heat transfer arrangement furthermore preferably transfers waste heat generated by a heat-generating device of a galley to the process air flowing through the process air line.

A fluid, which is heated by the waste heat of the cooler and/or the waste heat of the heat-generating device of the galley, is preferably brought into thermal contact with the process air flowing through the process air line by means of a heat exchanger of the heat transfer arrangement.

The heat exchanger of the heat transfer arrangement may be connectable to a heat carrier circuit in which the fluid heated by the waste heat of the cooler and/or the waste heat of the heat-generating device of the galley circulates.

Waste heat generated by the cooler and/or waste heat generated by the heat-generating device of the galley may furthermore be transferred to a cabin air extraction system by means of a further heat transfer arrangement.

A fluid heated by the waste heat of the cooler and/or the waste heat of the heat-generating device of the galley may be brought into thermal contact with cabin exhaust air flowing through a cabin exhaust air line of the cabin air extraction system by means of a further heat exchanger of the further heat transfer arrangement. The further heat exchanger of the further heat transfer arrangement may be connectable to the heat carrier circuit in which the fluid heated by the waste heat of the cooler and/or the waste heat of the heat-generating device of the galley circulates.

The operation of the heat transfer arrangement and the further heat transfer arrangement is preferably controlled by means of a control unit according to a set temperature of the process air to be supplied to the working area of the aircraft cabin in such a way that the waste heat generated by the cooler and/or the heat-generating device of the galley is alternatively transferred to the process air flowing through the process air line or to the cabin air extraction system in order to heat the process air flowing through the process air line to the desired set temperature.

The control unit preferably controls a valve arrangement in such a way that the fluid which circulates in the heat carrier circuit and is heated by the waste heat of the cooler and/or the waste heat of the heat-generating device of the galley is alternatively brought into thermal contact with the process air flowing through the process air line or the cabin exhaust air flowing through the cabin exhaust air line of the cabin extraction system according to the set temperature of the process air to be supplied to the working area of the aircraft cabin.

BRIEF DESCRIPTION OF THE DRAWINGS

A preferred embodiment of the invention is now explained in more detail with reference to the accompanying schematic drawing, in which The FIGURE shows a schematic illustration of an aircraft air-conditioning system.

DETAILED DESCRIPTION OF THE PREFERRED EMBODIMENTS

An air-conditioning system 10 shown in the FIGURE comprises an air-conditioning unit 12 to which compressed engine bleed air is supplied from an engine or an auxiliary engine of the aircraft or compressed air is supplied from a compressor. In the air-conditioning unit 12, the compressed air is cooled and expanded as it flows through at least one heat exchanger and diverse compression and expansion devices. The temperature of the process air exiting the air-conditioning unit 12 is controlled according to the cooling requirement of an aircraft cabin divided into different air-conditioning zones. In particular, the operation of the air-conditioning unit 12 is controlled in such a way that the temperature of the air exiting the air-conditioning unit 12 is sufficiently low to also meet the cooling requirement of the air-conditioning zone of the aircraft cabin with the highest cooling requirement—normally this is an economy class area of the aircraft cabin. For example, the air-conditioning unit 12 generates process air at a temperature of approximately 11° C.

The cooled process air generated by the air-conditioning unit 12 is conducted into the different air-conditioning zones of the aircraft cabin by way of a process air line 14. In FIG. 1, a portion of the process air line 14 is shown which serves to conduct the cooled process air generated by the air-conditioning unit 12 into a working area 16 of the aircraft cabin. The working area 16 of the aircraft cabin is situated adjacent to the doors of the aircraft cabin (not shown in FIG. 1). A galley 18 is arranged in the working area 16.

Since there are normally comparatively few people in the working area 16, and the working area 16 is moreover cooled by the transfer of cooling energy from cold surfaces of the aircraft doors and cooled galley devices, the process air flowing through the process air line 14 has to be heated to a higher temperature before being supplied into the working area 16 in order to enable comfortable ambient conditions to be set in the working area 16.

A cooler 20 in the form of an air chiller is associated with the galley 18. The cooler 20 serves to supply cooling energy to areas of the galley 18 which are to be cooled. The galley areas to be cooled may be for example galley compartments which serve to store foodstuffs provided for distribution to the aircraft passengers. The cooler 20 generates waste heat during operation. A heat-generating device 22 is moreover present in the galley 18. The heat-generating galley device 22 may be for example an oven, a device for preparing hot drinks or any other galley device which generates waste heat during operation.

The aircraft air-conditioning system 10 further comprises a heat transfer arrangement 24 which serves to transfer the waste heat generated by the cooler 20 and the waste heat generated by the heat-generating galley device 22 to the process air flowing through the process air line 14. The heat transfer arrangement 24 comprises a heat exchanger 26 through which process air supplied to the heat exchanger 26 by way of the process air line 14 flows on its cold side. On the other hand, a fluid, particularly in the form of a liquid heat carrier medium, can flow through the heat exchanger 26 on its hot side and circulates in a heat carrier circuit 28 which serves to discharge waste heat from the cooler 20 and the heat-generating galley device 22.

The cooler 20 and the heat-generating galley device 22 are arranged parallel to one another in the heat carrier circuit 28. A conveyor device 30, which is arranged in the heat carrier circuit 28 and is constructed in the form of a pump, serves to convey the heat carrier fluid through the heat carrier circuit 28. As an alternative to this, natural circulation can also be provided to convey the heat carrier fluid through the heat carrier circuit 28. The transfer of the waste heat from the cooler 20 and the heat-generating galley device 22 to the heat carrier fluid circulating through the heat carrier circuit 28 takes place by way of the respective heat exchanger 32, 34 associated with the cooler 20 or the heat-generating galley device 22.

The aircraft air-conditioning system 10 furthermore comprises a further heat transfer arrangement 36. The further heat transfer arrangement 36 serves to transfer waste heat generated by the cooler 20 and the heat-generating galley device 22 to a cabin air extraction system 38 as required. In particular, the further heat transfer arrangement 36 comprises a further heat exchanger 40 through which cabin exhaust air conducted through a cabin exhaust air line 42 of the cabin air extraction system 38 flows on its cold side. On the other hand, the hot side of the further heat exchanger 40 is connectable to the heat carrier circuit 29 in which the heat carrier fluid heated by the waste heat of the cooler 20 and the heat-generating galley device 22 is guided in a circuit. A conveyor device 43 constructed in the form of a fan serves to convey the cabin exhaust air to be discharged from the aircraft cabin through the cabin exhaust air line 42 of the cabin air extraction system 38.

The operation of the heat transfer arrangement 24 and the further heat transfer arrangement 36 is controlled by an electronic control unit 44. According to a set temperature of the process air supplied to the working area 16 of the aircraft cabin by way of the process air line 14, the control unit 44 controls a valve arrangement 50 comprising two valves 46, 48 in such a way that the heat carrier fluid circulating in the heat carrier circuit 28 is alternatively conducted through the heat exchanger 26 of the heat transfer arrangement 24 or the further heat exchanger 40 of the further heat transfer arrangement 36. Therefore, the waste heat of the cooler 20 and the heat-generating galley device 22 is optionally transferred either to the process air flowing through the process air line 14 or the cabin exhaust air flowing through the cabin exhaust air line 42 of the cabin air extraction system 38.

The valves 46, 48 of the valve arrangement 50 have a variably adjustable flow cross-section so that the fluid volume flows which are supplied to the heat exchanger 26 of the heat transfer arrangement 24 or the further heat exchanger 40 of the further heat transfer arrangement 36 can always be controlled so that the process air flowing through the process air line 14 is heated to the desired set temperature before the process air is supplied into the working area 16. The cabin exhaust air flowing through the further heat exchanger 40 of the further transfer arrangement 36 is discharged to the aircraft environment after it exits the further heat exchanger 40.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:
1. An aircraft air-conditioning system comprising:
   an air-conditioning unit which provides cooled process air at a temperature set for a first air-conditioning zone of an aircraft cabin having the highest cooling requirement,
   a process air line which conducts the cooled process air provided by the air-conditioning unit into a working area of the aircraft cabin, the working area being a second air-conditioning zone of the aircraft cabin hav- ing a lower cooling requirement than the first air-conditioning zone of the aircraft cabin,
a cooler which supplies cooling energy to a device to be cooled located in the working area of the aircraft cabin, and
a heat transfer arrangement which transfers waste heat generated by the cooler to the cooled process air flowing through the process air line.

2. The aircraft air-conditioning system according to claim 1, wherein the heat transfer arrangement further transfers waste heat generated by a heat-generating device of a galley to the cooled process air flowing through the process air line.

3. The aircraft air-conditioning system according to claim 1, wherein the heat transfer arrangement comprises a heat exchanger which is configured to bring fluid heated by at least one of the waste heat of the cooler or waste heat of a heat-generating device of a galley into thermal contact with the cooled process air flowing through the process air line.

4. The aircraft air-conditioning system according to claim 3, wherein the heat exchanger of the heat transfer arrangement is connectable to a heat carrier circuit in which the fluid heated by at least one of the waste heat of the cooler or the waste heat of the heat-generating device of the galley circulates.

5. The aircraft air-conditioning system according to claim 1, further comprising a further heat transfer arrangement, which transfers at least one of waste heat generated by the cooler or waste heat generated by a heat-generating device of a galley to a cabin air extraction system.

6. The aircraft air-conditioning system according to claim 5, wherein the further heat transfer arrangement comprises a further heat exchanger which brings a fluid heated by at least one of the waste heat of the cooler or the waste heat of the heat-generating device of the galley into thermal contact with cabin exhaust air flowing through a cabin exhaust-air line of the cabin air extraction system, wherein the further heat exchanger of the further heat transfer arrangement is connectable to a heat carrier circuit in which the fluid heated by at least one of the waste heat of the cooler or the waste heat of the heat-generating device of the galley circulates.

7. The aircraft air-conditioning system according to claim 5, further comprising a control unit which is designed to control the operation of the heat transfer arrangement and the further heat transfer arrangement according to a set temperature of the cooled process air to be supplied to the working area of the aircraft cabin in such a way that at least one of the waste heat generated by the cooler or the heat-generating device of the galley is either transferred to the cooled process air flowing through the process air line or to the cabin air extraction system in order to heat the cooled process air flowing through the process air line to the set temperature.

8. The aircraft air-conditioning system according to claim 7, wherein the control unit controls a valve arrangement in such a way that the fluid circulating in a heat carrier circuit and heated by at least one of the waste heat of the cooler or the waste heat of the heat-generating device of the galley is brought into thermal contact with the cooled process air flowing through one of the process air line or the cabin exhaust air flowing through the cabin exhaust air line of the cabin air extraction system according to the set temperature of the cooled process air to be supplied to the working area of the aircraft cabin.

9. A process for working an aircraft air-conditioning system, the air-conditioning system comprising:

an air-conditioning unit which provides cooled process air at a temperature set for a first air-conditioning zone of an aircraft cabin having the highest cooling requirement,
a process air line which conducts the cooled process air provided by the air-conditioning unit into a working area of the aircraft cabin, the working area being a second air-conditioning zone of the aircraft cabin having a lower cooling requirement than the first air-conditioning zone of the aircraft cabin,
a cooler which supplies cooling energy to a device to be cooled located in the working area of the aircraft cabin, and
a heat transfer arrangement which transfers waste heat generated by the cooler to the cooled process air flowing through the process air line the process comprising the steps:
providing cooled process air by means of the air-conditioning unit,
conducting the cooled process air provided by the air-conditioning unit into the working area of the aircraft cabin by means of the process air line, and
supplying cooling energy by means of the cooler to the device to be cooled which is located in the working area of the aircraft cabin,
wherein the waste heat generated by the cooler is transferred by means of the heat transfer arrangement to the process air flowing through the process air line.

10. The process according to claim 9, wherein the heat transfer arrangement further transfers waste heat generated by a heat-generating device of a galley to the process air flowing through the process air line.

11. The process according to claim 9, wherein a fluid heated by at least one of the waste heat of the cooler or waste heat of a heat-generating device of a galley is brought into thermal contact with the process air flowing through the process air line by means of a heat exchanger of the heat transfer arrangement.

12. The process according to claim 11, wherein the heat exchanger of the heat transfer arrangement is connectable to a heat carrier circuit in which the fluid heated by at least one of the waste heat of the cooler or the waste heat of the heat-generating device of the galley circulates.

13. The process according to claim 9, wherein at least one of the waste heat generated by the cooler or waste heat generated by a heat-generating device of a galley is transferred to a cabin air extraction system by means of a further heat transfer arrangement.

14. The process according to claim 13, wherein a fluid heated by at least one of the waste heat of the cooler and the waste heat of the heat-generating device of the galley is brought into thermal contact with cabin exhaust air flowing through a cabin exhaust air line of the cabin air extraction system by means of a further heat exchanger.

15. The process according to claim 13, wherein the further heat exchanger of the further heat transfer arrangement is connectable to a heat carrier circuit in which the fluid heated by at least one of the waste heat of the cooler or the waste heat of the heat-generating device of the galley circulates.

16. The process according to claim 13, wherein the operation of the heat transfer arrangement and the further heat transfer arrangement is controlled by means of a control unit according to a set temperature of the process air to be supplied to the working area of the aircraft cabin in such a way that at least one of the waste heat generated by the cooler or the heat-generating device of the galley is alternatively transferred to the process air flowing through one of the process air line and to the cabin air extraction system in order to heat the process air flowing through the process air line to the set temperature.

17. The process according to claim 16, wherein the control unit controls a valve arrangement in such a way that the fluid circulating in a heat carrier circuit and heated by at least one of the waste heat of the cooler or the waste heat of the heat-generating device of the galley is alternatively brought into thermal contact with the process air flowing through the process air line or the cabin exhaust air flowing through the cabin exhaust air line of the cabin air extraction system according to the set temperature of the process air to be supplied to the working area of the aircraft cabin.

* * * * *